United States Patent [19]

Lyons

[11] Patent Number: 4,803,771

[45] Date of Patent: Feb. 14, 1989

[54] PROCESS FOR REMOVING ASBESTOS USING TAPED TROUGHS

[76] Inventor: William G. Lyons, 34 Freemens Bridge Rd., Scotia, N.Y. 12302

[21] Appl. No.: 141,711

[22] Filed: Jan. 7, 1988

[51] Int. Cl.[4] .............................................. B23P 19/02

[52] U.S. Cl. .................................. 29/426.4; 29/426.5; 15/257 R; 15/104.04; 134/42; 134/25.4

[58] Field of Search ............................ 29/426.4, 426.5; 312/11; 15/227, 104.4, 257 R; 138/97, 112; 134/21, 42, 62, 25.4, 201; 128/1 R; 220/85 R, 23.83; 137/15

[56] References Cited

U.S. PATENT DOCUMENTS

| | | | |
|---|---|---|---|
| 2,364,536 | 12/1944 | Kent | 134/42 X |
| 3,342,638 | 9/1967 | Wanzenberg | 134/42 X |
| 3,374,117 | 3/1968 | Savage | 134/21 X |
| 3,432,348 | 3/1969 | Jones, Jr. | 134/42 |
| 3,657,012 | 4/1972 | Verat et al. | 134/42 X |
| 3,734,775 | 5/1973 | Brown | 134/21 X |
| 4,064,884 | 12/1977 | Asp | 134/21 X |
| 4,092,175 | 5/1978 | Martin | 134/42 |
| 4,467,508 | 8/1984 | Fjallstrom | 29/426.4 X |
| 4,626,291 | 12/1986 | Natale | 15/227 X |
| 4,699,027 | 10/1987 | Guyette | 29/426.4 X |

FOREIGN PATENT DOCUMENTS

| | | | |
|---|---|---|---|
| 631710 | 11/1949 | United Kingdom | 15/257 R |

*Primary Examiner*—Charlie T. Moon

*Attorney, Agent, or Firm*—Jerome J. Norris

[57] ABSTRACT

A process for use in wet removal of asbestos from pipes comprising placing a trough about an asbestos covered pipe, securing said trough around said pipe, adhering a continuous seal between trough end walls and said pipe, immersing said pipe in water, to soften said asbestos, draining off the water, removing said asbestos with a tool, and wiping the pipe with an oil or water soaked rag.

10 Claims, 2 Drawing Sheets

PROCESS FOR REMOVING ASBESTOS USING TAPED TROUGHS

FIELD OF THE INVENTION

The invention relates to a process of using taped troughs for wet removal of asbestos insulation or other hazardous materials from pipes and pipe joints of various shapes, which are disposed horizontally, vertically or otherwise. The process allows swift, easy and safe removal without the risks of friable particles escaping into the air.

BACKGROUND OF THE INVENTION

Asbestos has been used for pipe insulation, and this specific insulation has been applied to pipes in the forms of preformed fibrous asbestos wrapping, asbestos fiber felt, insulated cement, corrugated paper and in mixtures of magnesia with asbestos. The applied asbestos insulating material is generally covered with a protective jacket made of cloth, paper or cement. In some instances, the asbestos insulation is covered with tape or millboard.

However, asbestos has been found to be harmful to human beings and its fields of application are either being eliminated or increasingly restricted. The reason is that asbestos adheres in the lungs upon inhalation and spreads to other parts of the body, and becomes, among other things, a known carcinogen. In view of these known risks of asbestos as a health hazard, public officials have required the removal of asbestos insulation materials that have been applied in: the construction field; heating insulation; partition walls; fire retarding materials in floor structures, etc.

During the removal of asbestos, the area of removal is generally sealed off and the asbestos is sucked into containers from which the dust-like asbestos particles are removed and packed into plastic bags. The bags are taken to garbage stations where they are stored or buried. However, during these handling operations there is a risk that the asbestos will escape from the bags, either when the asbestos is being filled into the bags or during transport if a bag is damaged.

In the case where large amounts of asbestos are transported to garbage stations, water is poured over the asbestos to prevent dust formation.

However, because of the health risks posed by dust, sealing off or containment of the work area from which asbestos is to be removed is essential, and such containment requires construction of barriers with plastic sheets joined with folded seams and sealing tape at the seams and boundaries. Moreover, air locks and worker decontamination facilities equipped with showers must be employed when a negative air pressure system is used in concert with the sealing off or containment method and abatement or removal activities are generally carried out during vacations or at times when few people are in the premises in order to reduce risks.

In these circumstances, it is well known that the cost of containment can often times exceed the cost of the actual abatement. Further yet, in these containment procedures for asbestos abatement or removal, the worker is still required to enter the containment area in order to remove the asbestos.

In the area of containment, it is also known that, during removal of asbestos insulation coverings from pipes and valves, the operation is attendant with risks because of the tendency for remnants or small asbestos fibers to remain intact around the pipes and valves, and become airborne, either during removal or at a later point in time after the removal operation is finished.

The invention relates to a complete wet method for removing and recovering harmful insulating materials which are detrimental to the environment, in a manner such that the materials are not dissipated into the surroundings to pollute the environment and harm human beings. One of the materials falling into this harmful category is asbestos.

It is an object of the present invention to provide a process of using taped trough means for complete wet removal of asbestos insulation and other hazardous materials from pipes, joints and valves, without the need to provide an elaborate containment area having construction barriers with plastic sheets joined with folded seams, and sealing tape at the seams.

It is a further object of the invention to provide a process of using taped trough means for complete wet removal of asbestos insulation and other hazardous materials from pipes, joints and valves, without the need to provide air locks and worker decontamination facilities with showers, in association with a containment area.

A yet further object of the invention is to provide a process of using taped trough means for complete wet removal of asbestos insulation and other hazardous materials from pipes, joints and valves, without the need for establishing negative air pressure systems to insure against escape of harmful fiber particles into the environment.

These and other objects of the invention will become more apparent from the disclosure, and detailed descriptions hereinafter set forth.

SUMMARY OF THE INVENTION

In accordance with the present invention, taped troughs are used in a process for maintaining asbestos insulated pipes and joints immersed in an aqueous solution in order to facilitate complete wet removal of aqueous solution saturated asbestos fibers, without the risks of asbestos fibers escaping into the environment or atmosphere.

In this process, in the case of a horizontally disposed asbestos insulated pipe, a semi-cylindrical trough is positioned around an asbestos covered pipe. Support bars are pushed through opposing porthole openings in a part of the upper trough walls to secure the trough in place around the insulated pipe. Waterproof adhesive tape is then removably adhered over the trough end walls and around the asbestos covered pipe to create a sealing continuum between the end walls and the pipe to ensure against leakage or seepage, after the trough surrounded pipe length is immersed in water. In order to avoid the need to effect seals in any spaces between the porthole openings and the support bars, the parts of the support bars which rest on the pipes may be stepped invertedly with a riser in order to prevent the level of added water from rising to the lowest part of the porthole-slot-support-bar-juncture. Alternatively, the support bars can have a semi-circular arc riser to prevent the water from rising to the bottom part of the port opening.

After the asbestos covered pipe has been completely soaked from complete immersion in an aqueous solution for a period of from about ten minutes to about one hour, the solution may be removed through a trough drain and filtered for re-use, or, in the alternative, the trough containing the solution may be removed.

The aqueous solution saturated asbestos material is removed with a plastic or metal tool, such as a chisel or spatula, and placed into a plastic bag for disposal in a licensed land fill or other sanctioned areas. The uncovered pipe is then thoroughly wiped with a wet cloth, and the wet cloth may be discarded into the plastic bag for disposal along with the asbestos. It has been found that the complete wet removal process of the invention only requires about one-tenth of the time ordinarily needed to remove asbestos through containment methods using negative air means.

In the process of removing asbestos from vertically disposed asbestos covered pipe, two mating halves of semi-cylindrical troughs are placed around a pipe and flanges of these troughs abutt diametrally when the trough is in place around the pipe. Clamping means are placed about the joined troughs to secure them firmly in place around the pipe, and the bottom of the trough end walls are removably adhesively joined to asbestos covered pipe by waterproof adhesive tape before the aqueous solution is poured in from the top to completely immerse the asbestos areas of the entroughed vertical pipe length to be soaked. Pretensioned foam rubber strips may be affixed to interior parts of the trough walls in order to assist in securing the troughs around the pipe immediately prior to placing the troughs in matching or mating relationship around the pipe. After soaking, the solution may be removed through a trough drain in the lower part of one of the semi-cylindrical troughs and filtered for re-use if desired.

DETAILED DESCRIPTION OF THE INVENTION

Figure 1:
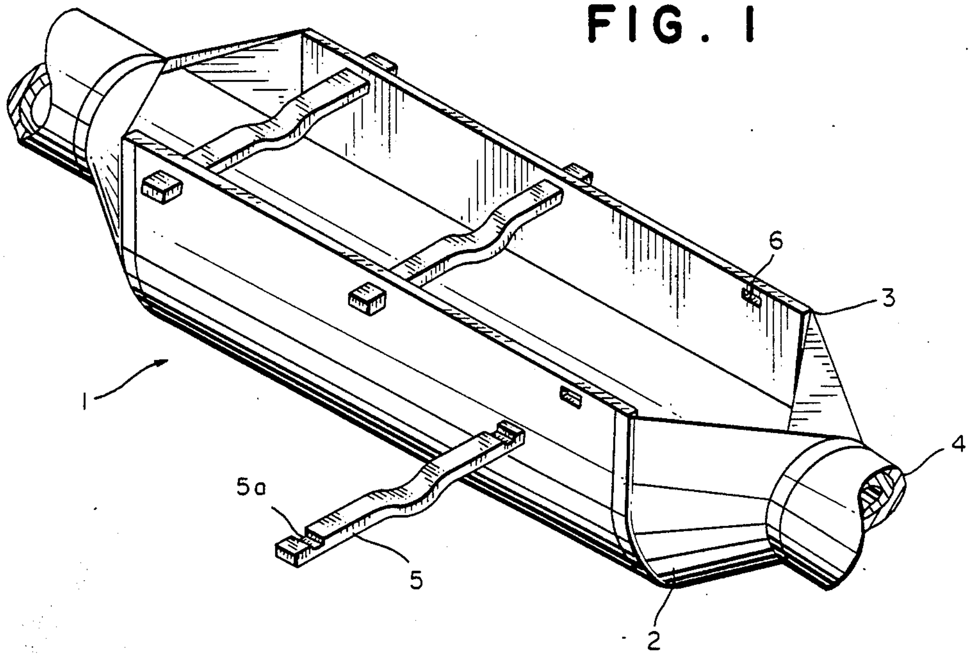
FIG. 1 is an exploded view in perspective showing a horizontally entroughed asbestos covered pipe before all of the support bars are inserted to secure it in place around the pipe.
Figure 2:
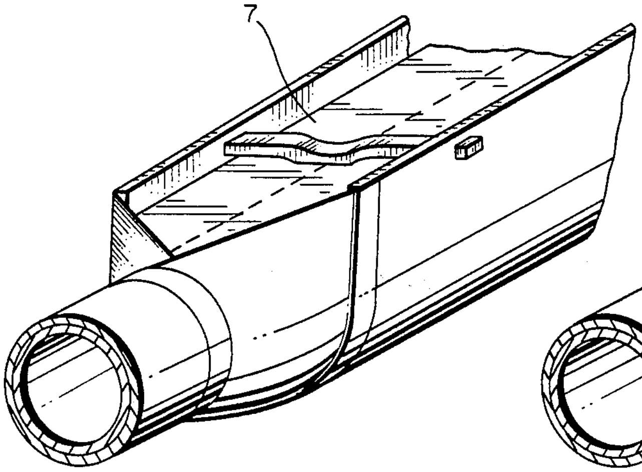
FIG. 2 is a view in perspective showing a horizontally entroughed asbestos covered pipe with support bar in place, and water surrounding said pipe.

Referring to the drawings, FIG. 1 depicts a semi-cylindrical trough 1, positioned about an asbestos covered pipe. Waterproof adhesive tape 2, is removably adhered over trough end wall 3, and around asbestos covered pipe 4, to provide a sealing continuum, after support bars 5, with semi-circular or inverted stepped risers are placed through porthole openings 6, in the upper wall part of the trough in resting position on the asbestos covered pipe.

The taping ensures retention of enough aqueous solution or water in the trough to completely immerse and soak the asbestos covered pipe for saturation and loosening of asbestos.

If need be, sealing by using Neoprene® or gasket putty may be effected in the spaces between the porthole openings in the trough and the support bar juncture on said openings. Also, slots **5*a*** can be placed in the top or bottom near the end of the support bars to effect a firm hold between said slots and the openings in the walls of the trough.

A removable seal may also be effected by encircling a deformable and openable pretensioned waterproof foamed rubber material around said pipe inside of the taped area in order to close off any spaces between said pipe and the waterproof adhesive tape.

Alternatively, on openable plastic or rubber washer can also be placed around the asbestos covered pipe in order to provide a removable seal, immediately prior to pouring an aqueous solution into the trough to completely immerse said covered pipe in water 7.

If it is desired to avoid any need to effect a seal between the porthole slots and the support bars, the lower portion of the support bars which rests on the upper part of the asbestos covered pipe may be provided with either a horizontal inverted step or riser or an inverted loop or semi-circular riser in order to prevent the level of added water from rising as high as the lower part of the porthole openings.

Figure 3:
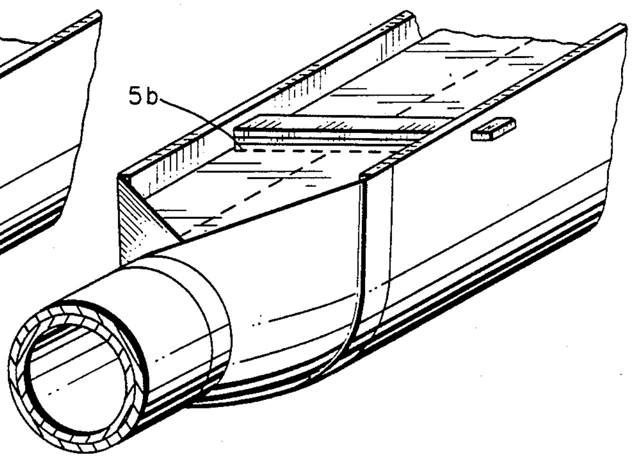
FIG. 3 is a view in perspective as in FIG. 2 but showing inverted stepped support bars.

FIG. 3 shows a horizontally entroughed asbestos covered pipe with inverted stepped support bars **5*b*** in place, and water completely immersing said pipe, but with the highest level of water below the lowest part of the porthole openings.

After water is added in sufficient amount to completely immerse the asbestos covered pipe, soaking is allowed for a period ranging from about ten minutes to about one hour. The time of soaking which is needed to completely saturate, soften and loosen the asbestos will depend upon the thickness of the asbestos coating. In general, however, thicker coatings will require longer soaking times. It has been found that adding small amounts of emulsifiers such as Serpiflex® increases the water penetration rate and reduces the soaking time needed to soften the asbestos to a point where it can be mechanically removed without risks of friable particles or fibers escaping into the air.

While semi-circular troughs are easily adaptable for effecting soaking on straight horizontally disposed or straight vertically disposed asbestos covered pipes, it is to be understood that rectangular shaped troughs are preferred to accommodate horizontally and vertically disposed asbestos covered pipes and joints which are not straight.

Figure 5:
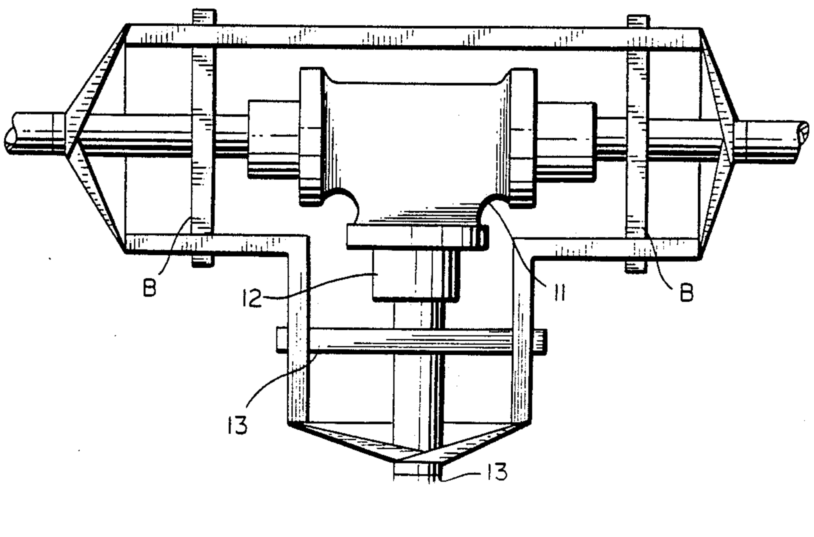
FIG. 5 is a top view in perspective showing trough means for a horizontally disposed "tee" pipe connection with "branch" and "run".

An example of an asbestos covered pipe that is not straight is shown in FIG. 5 with "tee" 11, "run" 12, and "branch" 13. In this pipe and joint configuration, the trough is T shaped and has three end wall openings which fit around the "tee" joint segment for asbestos removal.

After soaking for a sufficient period to completely wet, saturate and soften the asbestos, the water may be removed by either removing the trough or draining off the water through a drain cock situated at the bottom of the trough.

Figure 4:
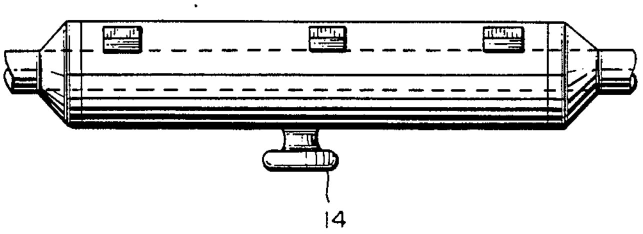
FIG. 4 is a side view in perspective showing a drain cock for removal of water from a horizontally disposed trough in accordance with the invention.

FIG. 4 depicts a drain cock 14 which is integral to the bottom of a semi-circular shaped trough. However, the drain cock can be made integral to the base portion area of any geometrically shaped trough that is used within the context of the invention for purposes of removing the water prior to filtering (not shown) and re-using it. While the length of trough section is preferred to be 6 feet, any length will suffice.

It has been found that the soaked and softened asbestos is most easily removed if a longitudinal or horizontal slit is made in the loosened asbestos covering along the pipe length with a knife before removing the asbestos with a plastic tool, such as a chisel or spatula. Also, if the asbestos covering has been painted over, longitudinal slitting prior to removal facilitates more rapid removal of the asbestos insulation covering. On the other hand, if tin or some other metal gauge bands have been placed around the asbestos insulation covering, it will be necessary to cut the bands prior to slitting and removing the softened asbestos covering. After the covering has been substantially completely removed with a plastic chisel or spatula, the pipe may be wiped with either a wet cloth or an oil soaked rag to ensure that remnants of friable asbestos particles which have remained intact on the pipe are removed. This latter step would prevent escapement to the environment of any remaining friable asbestos particles.

When compared to the containment, sealing off, and negative air combination methods of asbestos abatement, the trough devices used in the present invention enables the abatement process to proceed more simply and more economically, and in times up to as much as about one-tenth of the time normally required by the combination method.

FIG. 5 is a top view in perspective showing a rectangular shaped trough accommodating a horizontally disposed asbestos covered pipe which is not straight. "Tee" part 11 and "Branch" part 12 are positioned within the trough as are portions of "runs" 13. Bars B, support the weight of the trough on the "runs".

Figure 6:
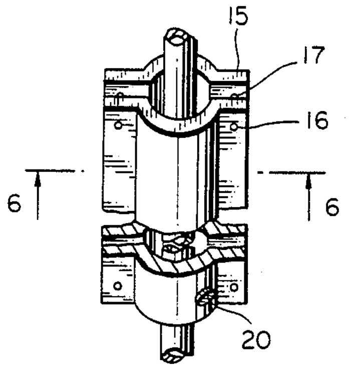
FIG. 6 is a side view in perspective showing mating halves of semi-cylindrical troughs joined diametrally at their flanges in place around a vertically disposed pipe.

When the trough is flanged, as in FIG. 6, two mating halves of semi-cylindrical troughs may be diametrally joined at the flanges around a vertical disposed asbestos covered pipe, where flanges 15 may sandwich rubber or plastic gaskets 17 therebetween, and wherein bolts 16 can be used in the holes along with nuts (not shown) to hold the flanges together. Optionally, the flanges may be held together without bolting by the use of any suitable clamping means (not shown). The means used to maintain the two halves of semi-cylindrical troughs in contact with the vertically disposed asbestos covered pipe are pretensioned water permeable foamed rubber strips 18, which can be affixed by gluing or any other suitable means in the interior of each semi-cylindrical trough. Clamps (not shown) placed over the rubber strips exterior to the troughs can be used to hold the trough in place.

Figure 6A:
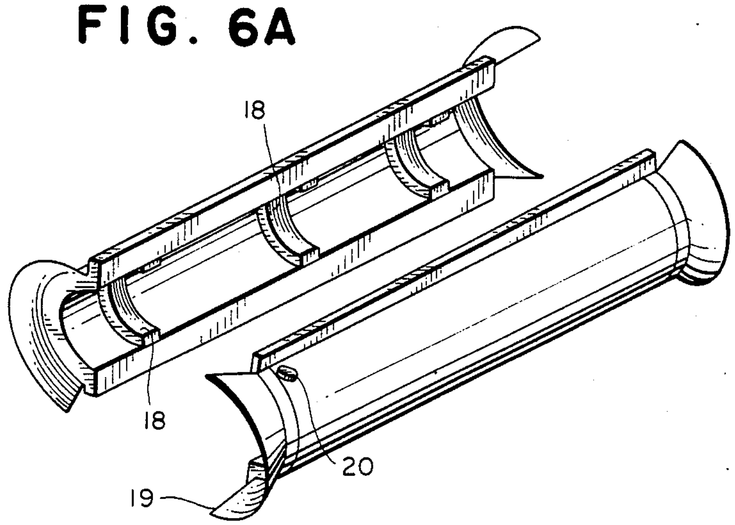
FIG. 6A shows two semi-cylindrical troughs without the asbestos pipe.

In order to ensure that the weight of water in the column around the vertically disposed pipe is held fast, the waterproof adhesive tape 19 of FIG. 6A can be doubled or wrapped in multiples at the semi-cylindrical trough ends and about the asbestos covered pipe, prior to adding the water. Further, a Neoprene® or rubber gasket or an openable plastic or rubber washer can be used in any spaces between the pipe and the tape to further effect a seal of sufficient strength to hold the weight of water in the column free from leakage or seeping.

After water is poured into the unsealed top portion of the vertically entroughed pipe and allowed to remain for a sufficient period to soften the asbestos insulation covering, the water is drained off through a drain cock 20 which forms an integral part with a lower portion of a semi-cylindrical wall of the trough, and the asbestos insulation is cleaned-off in the same manner described in connection with the horizontally disposed pipe.

Figure 7:
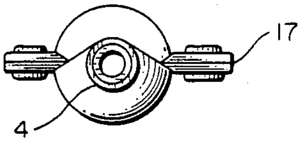
FIG. 7 is a view taken along line 6—6 of FIG. 6.

FIG. 7 is a view taken along line 6—6 of FIG. 6, showing an asbestos covered pipe 4.

Figure 8:
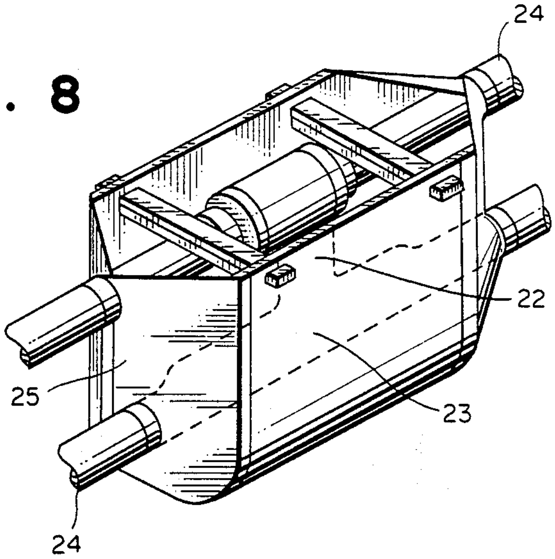
FIG. 8 is a view in perspective showing mating halves of troughs with flanges in place around a vertically disposed pipe having "tee" joints and a "branch".

FIG. 8 is a view in perspective showing a trough in place around a vertically disposed non-straight pipe having a "tee joint" 22, a "branch" 23, and "runs" 24. The waterproof adhesive tape 25 is removably sealed over the end walls of the trough and around the "runs" of the pipe joint prior to adding water for soaking.

The advance made to the art of asbestos abatement or removal using the soaking troughs of the present invention enables asbestos removal contractors to simply and economically remove or clean asbestos away from single or branched pipes, whether horizontally or vertically disposed, in a fraction of the time normally required when using other devices and methods for removal. Moreover, the wet removal process of the invention prevents friable particles from escaping into the air, and thereby allows removal without elaborate equipment from any size of covered pipe.

The invention has been described in detailed specifics for purposes of illustration only, and it is to be understood that many changes in the intracacies of construction of the trough soaking devices of the invention can be made without departing from the invention scope, which is defined in the appended claims.

What is claimed is:

1. A process for complete wet removal of asbestos insulation covering and like hazardous materials from pipes, joints and valves comprising:

placing at least one trough about an asbestos covered pipe;

securing said trough about said asbestos covered pipe by trough securing means;

removably adhering waterproof tape to end walls of said trough and said pipe to form a sealing continuum between said end walls and said pipe;

adding an aqueous solution to the sealed off trough to completely immerse said pipe for a period sufficient to soften said asbestos;

draining off the aqueous solution;

removing the asbestos with a tool; and wiping the pipe with an oil or water soaked rag.

2. The process of claim 1, wherein said trough is semi-cylindrical in shape, and said trough securing means comprises opposing porthole openings in upper wall portions of said trough and support bars adapted to rest on said pipe when placed through said openings.

3. The process of claim 1, wherein said support bars are provided with inverted step portions which rest on said pipe.

4. The process of claim 1, wherein said trough is rectangular in shape.

5. The process of claim 4, wherein said support bars are provided with a semi-circular riser to rest on said pipe.

6. The process of claim 1, wherein two semi-cylindrical shaped troughs flanged diametrally are positioned in mating relationship around a vertically disposed asbestos covered pipe; wherein pretensioned foam rubber strips are affixed to interior wall portions of said troughs to assist in securing said troughs on said pipe; and wherein holding means are used to hold the flanged portions of said trough secure in place around said pipe.

7. The process of claim 6, wherein the mating flanged portions have holes therethrough, and wherein said holding means comprises bolts and nuts.

8. The process of claim 1, wherein two rectangular shaped troughs flanged peripherically are positioned in mating relationship around a branched vertically disposed asbestos covered pipe; wherein pretensioned foam rubber strips are affixed to interior wall portions of said troughs to assist in securing said troughs on said pipe; and wherein holding means are used to hold the flanged portions of said trough secure in place around said pipe.

9. The process of claim 8, wherein the mating flanged portions have holes therethrough, and wherein said holding means comprises bolts and nuts.

10. The process of claim 1, wherein any spaces between said trough securing means are sealed by sealing means.

* * * * *